United States Patent Office.

ALFRED EINHORN, OF MUNICH, GERMANY, ASSIGNOR TO THE FARBWERKE, VORMALS MEISTER, LUCIUS & BRÜNING, OF HÖCHST-ON-THE-MAIN, GERMANY.

GLYCOCOLAMIDOCINNAMIC-ACID ESTER AND PROCESS OF MAKING SAME.

SPECIFICATION forming part of Letters Patent No. 625,159, dated May 16, 1899.

Application filed March 7, 1899. Serial No. 708,080. (Specimens.)

*To all whom it may concern:*

Be it known that I, ALFRED EINHORN, Ph. D., professor of chemistry, a citizen of the Empire of Germany, residing at Munich, Germany, have invented certain new and useful Improvements in the Manufacture of Glycocolamidocinnamic-Acid Esters, of which the following is a specification.

A compound characterized by its anesthetic power and which may serve as a substitute for cocain is obtained by first combining meta-amidocinnamicacid ester with chloracetylchlorid and then the thus-obtained chloracetylcinnamicacid ester with amins. Thus glycocolamidocinnamicacid esters are formed having the constitution

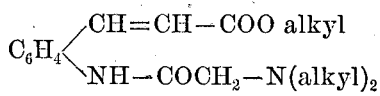

I illustrate the manufacture of the new compound by the following example: One hundred and seventy-seven grams of meta-amidocinnamicacid-methylester are dissolved with one hundred and thirteen grams of chloracetylchlorid in five hundred grams of benzene and heated until no further hydrochloric acid escapes. On cooling the solution the chloracetyl-meta-amidocinnamicacid-methylester crystallizes out. It melts from methylalcohol crystallized at 120° centigrade. From this compound two hundred and fifty-three grams are heated on the water-bath for about two hours with one hundred and forty-six grams of diethylamin and five hundred grams of alcohol, whereupon the alcohol is distilled off and soda solution added to the residue.

The new basic compound the diethylamidoacetyl-meta-amidocinnamicacid-methylester separates out. It is an oil easily soluble in ether, alcohol, benzene, and soluble with difficulty in water. From the ethereal solution of the compound the chlorhydrate of the ester is separated by addition of alcoholic hydrochloric acid having the melting-point 165° centigrade.

Having now described my invention, what I claim is—

1. The process for the manufacture of alkyl-amidoacetyl-meta-amidocinnamicacid esters, which consists, in first combining meta-amidocinnamicacid ester with chloracetylchlorid and then with amins, substantially as described.

2. As a new product, the diethylamidoacetyl-meta-amidocinnamicacid-methylester, being an oil easily soluble in alcohol, ether, benzene, soluble with difficulty in water, forming with acids salts soluble in water, its chlorhydrate having the melting-point 165° centigrade.

In testimony that I claim the foregoing as my invention I have signed my name in presence of two subscribing witnesses.

ALFRED EINHORN.

Witnesses:
 HALL PHILOMINA,
 EMIL HENZEL.